United States Patent [19]

Faller et al.

[11] 4,308,453
[45] Dec. 29, 1981

[54] ODOMETER FOR A VEHICLE

[75] Inventors: Jörg G. Faller, Furtwangen; Horst Kretz, Pforzheim; Eberhard Steinhauser, Vöhrenbach, all of Fed. Rep. of Germany

[73] Assignee: E. Wehrle GmbH, Furtwangen, Fed. Rep. of Germany

[21] Appl. No.: 94,958

[22] Filed: Nov. 16, 1979

[30] Foreign Application Priority Data

Nov. 28, 1978 [DE] Fed. Rep. of Germany ....... 2851476

[51] Int. Cl.³ .............................................. G01C 22/00
[52] U.S. Cl. ..................................... 235/95 B; 235/96
[58] Field of Search ..................... 235/95 B, 96, 95 R, 235/97; 73/490

[56] References Cited

U.S. PATENT DOCUMENTS 1,407,986  2/1922  Coressey ............................ 235/95 B
3,315,888  4/1967  Lockhart ........................... 235/95 B

FOREIGN PATENT DOCUMENTS 2143348  2/1974  Fed. Rep. of Germany .
2541321  3/1977  Fed. Rep. of Germany .

Primary Examiner—L. T. Hix
Assistant Examiner—Benjamin R. Fuller
Attorney, Agent, or Firm—Donald Brown

[57] ABSTRACT

An odometer i.e. a distance recorder, for a vehicle has a counting mechanism driven by a stepping mechanism which is in turn driven with rotation of a vehicle wheel. The stepping mechanism has a plurality of pawls which reciprocate with wheel rotation and which can advance respective ratchet wheels. For a given vehicle wheel size, one of the pawls is selected to operate its ratchet wheel by a cam means which then disables the or each other pawl from engagement with associated ratchet(s).

6 Claims, 5 Drawing Figures

U.S. Patent  Dec. 29, 1981  4,308,453
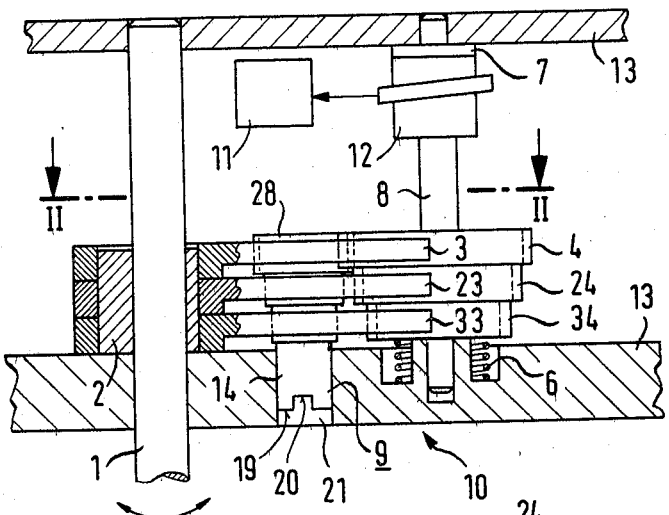
FIG.1
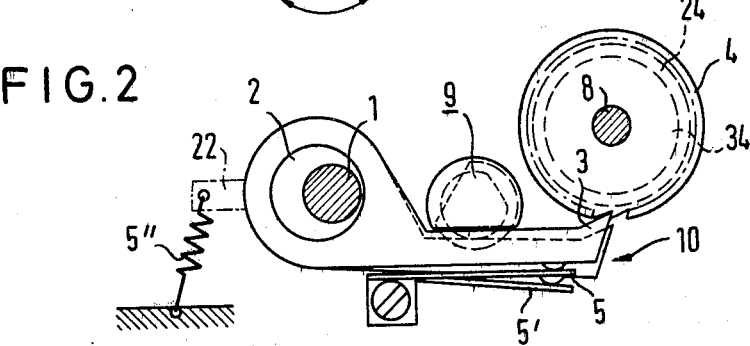
FIG.2
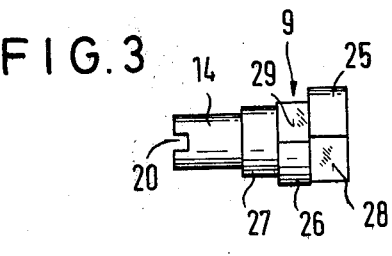
FIG.3
FIG.4
FIG.5
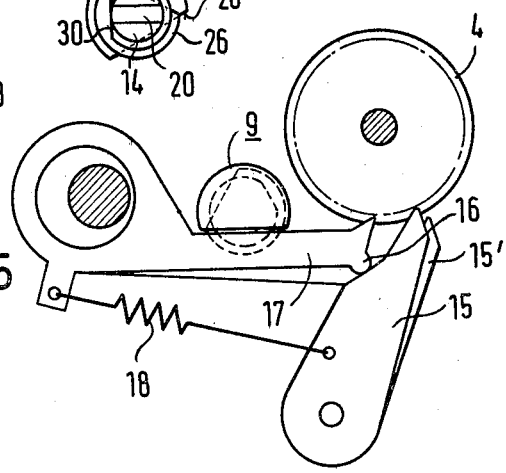

ODOMETER FOR A VEHICLE

This invention relates to an odometer, i.e. a distance or mileage recorder for a vehicle. The odometer of the invention is of the type having a counting mechanism which can be driven via a stepping mechanism upon rotation of a wheel of the vehicle, as a function of the speed of rotation of the wheel.

In one such odometer, as disclosed in German Published Patent Application No. 2143348, adaption to different vehicle wheel diameters involves exchanging at least one gear wheel in the intermediate drive between the counter and vehicle wheel. This exchange takes a relatively long time and requires access to a stock of appropriate gear wheels.

Proposed in German laid open Patent Application No. 2541321 in an odometer which has a step switch which is adjustable in accordance with the wheel size or other significant parameters of the vehicle and which, together with instruments measuring factors indicating speed and distance influences an electronic frequency divider which is connected to a downstream electromechanical or electronic counting mechanism. This arrangement is complex and expensive.

It is an object of the present invention to provide a mileage recorder which is of a simple design, can readily be set according to vehicle wheel size and in particular in which no exchange of parts is necessary according to vehicle wheel size.

In accordance with this invention there is provided an odometer comprising a stepping mechanism to be driven with rotation of a wheel of a vehicle, and a counting mechanism connected to be driven by the stepping mechanism, said stepping mechanism comprising: at least two ratchet wheels mounted on a shaft; said ratchet wheels being of different sizes and corresponding to different vehicle wheel sizes; respective pawls cooperating with said ratchet wheels; means to reciprocate said pawls upon rotation of the vehicle wheel so as to rotate said ratchet wheels; and a device for selectively disabling all except a selected one of said pawls from rotating the associated ratchet wheels, said one pawl being selected according to vehicle wheel size.

With the invention, adjustment of the odometer to vehicle wheel size can be simply effected with the disabling device which selects an appropriate ratchet wheel and pawl and is preferably accessible from the exterior.

The invention will be more clearly understood from the following description which is given by way of example only with reference to the accompanying drawings, in which:

FIG. 1 shows a plan view of the stepping mechanism of an odometer of the invention;

FIG. 2 is a section on the line II—II in FIG. 1;

FIG. 3 shows a detail of the stepping mechanism of FIGS. 1 and 2 in side view;

FIG. 4 shows the detail shown in FIG. 3 in front view; and

FIG. 5 is a sectional representation corresponding to FIG. 2 of another embodiment of the stepping mechanism.

The odometer of the invention generally comprises an input shaft 1 to be driven upon vehicle wheel rotation, for instance from an axle, pawls reciprocally driven by shaft 1, ratchet wheels to be rotated by the pawls and on a shaft 8, and a counting mechanism 11 driven by a member 12 on shaft 8.

The input shaft 1 is an eccentric shaft and is mounted in a frame 13, and has an eccentric 2 mounted thereon. Surrounding the eccentric 2 are eyes on the ends of three pawls 3, 23, 33, so that on rotation of shaft 1 rotary motion is converted to a reciprocating motion of the pawls and the direction of rotation of shaft 1 is immaterial because in either case the pawls reciprocate. The pawls can each interact with a respective ratchet wheel 4, 24, 34, these wheels being coaxially and securely located on an axis 8, mounted in the frame 13. The pawls 3, 23, 33 are biased by means of compression springs 5, 5', which are fixed to the frame and are shown as leaf springs, in such a way that, during their advance movement (to the right as shown), they engage with teeth of the ratchet wheels and thus turn the ratchet wheels a distance corresponding to one tooth. Secured on the axis 8 is a worm wheel 12 which drives the counting mechanism 11.

To avoid any reverse motion of the ratchet wheels 4, 24, 34, a frictional braking device 6, 7 is provided. This consists of a brake disc 7, providing frictional resistance against rotation between the frame 13 and the worm wheel 12, and a compression spring 6 which is located between the opposite wall of the frame and outermost stepping wheel 34 and which presses the worm wheel 12 against the brake disc 7.

The ratchet wheels have different diameters and correspond to different wheel diameters, and the intention is that only one pawl and its associated ratchet wheel should be in interengaging relation at any time.

On the side of the pawls 3, 23, 33, near a plane including the axes of the shaft 1 and the axis 8 is provided a cam body 9 which is mounted to be rotatable in the frame. It can be rotated by means of a cylindrical foot part 14 located within the frame, this part having an end face 19 accessible from the outside in which is a slot 20, by means of which the rotational position of the cam body 9 can be adjustable from exterior. After the adjustment, the position of the cam body can be secured by means of an insertion piece 21 so that the cam body cannot be inadvertently turned.

In the embodiment shown in the Figures, the cam body 9 has a cam surface corresponding to each pawl. Each such surface has cylindrical part, 25, 26, 27 with a plane cut-out part, 28, 29, 30 i.e. it has the section of a segment of a circle. The cut-out parts 28, 29, 30 are rotationally offset from each other. The cylindrical parts have sufficient diameter to hold the corresponding pawl out of contact with the associated ratchet wheel, while the cut-out parts allow engagement of the pawls with the ratchet wheels. In this way, depending on the angular position of the cam body 9, only one pawl can at any time engage with its corresponding ratchet wheel; the remaining pawls are moved into a rest position in which they make no such engagement.

Although three ratchet wheels, corresponding to three different vehicle wheel sizes, with associated pawls are shown in the illustrative embodiments shown in the Figures, a greater or lesser number of ratchet wheels and associated pawls can be provided in this manner, and these can be engageable by simply turning the cam body 9 by means of the cylindrical foot part 14.

As suggested in FIG. 2, the springs 5, 5' acting on the pawls can be replaced by tension spring such as 5'', one end of which is fixed to the frame 13 and the other end of which is fixed to a lug 22 formed integrally with the pawl in such a way as to bias the pawl towards engagement with the teeth of the associated ratchet wheel.

FIG. 5 shows an alternative arrangement of the means for preventing reverse rotation of the ratchet wheels, which are here secured against reverse rotation not by means of the frictional braking device 6, 7 as shown in FIG. 1, but instead by means of further pawls 15, 15', equal in number to the ratchet wheels. These pawls 15, 15' are brought into an engaged position with the ratchet wheel or into a disengaged position by means of a projection 16 on the associated one of pawls 3, 23, 33 here indicated at 17 which, due to the cam program, is the only one coming into engagement with the associated ratchet wheel. Each further pawl 15, 15' is biased towards the engaged position by means of a tension spring 18, and when in the engaged position, during retraction of the pawl 17, the further pawl 15 prevents reverse rotation of the ratchet wheels. Those further pawls 15' which are associated with the pawls which are not engaging their ratchet wheels, and which are thus pushed down by the cam part 9, are themselves set in a rest position out of contact with the ratchet wheels by reason of the projection 16 pushing them out of the way.

Using the odometer described above, a single preselection, which can be effected from the outside, according to a particular wheel size, can be made. Those pawls which are not required in each case are set into their rest positions by the corresponding adjustment of the cam body 9. It is no longer necessary to hold a stock of different gear wheels in readiness for a change of vehicle wheel size.

We claim:

1. An odometer comprising a stepping mechanism to be driven with rotation of a wheel of a vehicle, and a counting mechanism connected to be driven by the stepping mechanism, said stepping mechanism comprising: at least two ratchet wheels mounted on a shaft; said ratchet wheels being of different sizes and corresponding to different vehicle wheel sizes; respective pawls cooperating with said ratchet wheels; means to reciprocate said pawls upon rotation of the vehicle wheel so as to rotate said ratchet wheels; and a device for selectively disabling all except a selected one of said pawls from rotating the associated ratchet wheels, said one pawl being selected according to vehcile wheel size.

2. A odometer as claimed in claim 1 and comprising a single common shaft on which each said ratchet wheel is securely mounted.

3. An odometer as claimed in claim 2 and further comprising a transmission element coupled to said common shaft, said transmission element drivingly engaging said counting mechanism.

4. An odometer as claimed in claim 1, wherein said disabling device comprises a cam means having a cam surface for each said pawl, said surfaces being so arranged that when one pawl interacts with the associated ratchet wheels each other pawl is displaced to a position of non-interaction with the associated ratchet wheels.

5. An odometer as claimed in claim 1 and further comprising a friction brake associated with said ratchet wheels to hinder reverse rotation thereof.

6. An odometer as claimed in claim 1 and further comprising an additional pawl engageable with each said ratchet wheel to prevent reverse rotation of said ratchet wheels.

* * * * *